(12) United States Patent
Vannithamby et al.

(10) Patent No.: US 9,693,236 B2
(45) Date of Patent: Jun. 27, 2017

(54) LICENSED SHARED ACCESS SPECTRUM ALLOCATION

(71) Applicant: INTEL CORPORATION, Santa Clara, CA (US)

(72) Inventors: Rath Vannithamby, Portland, OR (US); Mohammad Rashid, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 184 days.

(21) Appl. No.: 14/497,416

(22) Filed: Sep. 26, 2014

(65) Prior Publication Data

US 2016/0094995 A1    Mar. 31, 2016

(51) Int. Cl.
*H04W 16/14* (2009.01)
*H04W 72/08* (2009.01)
*H04W 72/04* (2009.01)
*H04W 48/06* (2009.01)
*H04W 76/06* (2009.01)

(52) U.S. Cl.
CPC .......... *H04W 16/14* (2013.01); *H04W 48/06* (2013.01); *H04W 72/0453* (2013.01); *H04W 72/08* (2013.01); *H04W 76/068* (2013.01)

(58) Field of Classification Search
CPC ..... H04W 16/14; H04W 48/06; H04W 72/08; H04W 72/0453
See application file for complete search history.

(56) References Cited

U.S. PATENT DOCUMENTS

2015/0304853 A1* 10/2015 Murray ............... H04W 76/068
                                                              455/454
2016/0127912 A1*  5/2016 Markwart ............ H04W 16/14
                                                              455/447

FOREIGN PATENT DOCUMENTS

WO     2014078676 A2    5/2014
WO     2014112920 A1    7/2014

OTHER PUBLICATIONS

ISR from WIPO for PCT/US2015/045103 mailed Nov. 6, 2015.

* cited by examiner

*Primary Examiner* — Charles C Jiang
*Assistant Examiner* — Thad Defauw
(74) *Attorney, Agent, or Firm* — Thorpe North & Western

(57) ABSTRACT

A technology that is operable to release a licensed shared access (LSA) spectrum allocation in a communications network is disclosed. In one embodiment, an evolved node B (eNode B) is configured with circuitry configured to receive, from a spectrum release module located in an evolved packet core (EPC) of the communications network, a spectrum release message requesting the eNode B release one or more selected segments of an LSA spectrum. LSA spectrum release parameters are evaluated for releasing the one or more selected segments of the LSA spectrum. A LSA spectrum release schedule is determined based on the LSA spectrum release parameters. Selected secondary cells (SCells) are deactivated in the communications network based on the LSA spectrum release schedule to release the one or more selected segments of the LSA spectrum.

18 Claims, 7 Drawing Sheets

300

```
SystemInformationBlockType2-v9e0-IEs ::= SEQUENCE {
    ul-CarrierFreq-v9e0          ARFCN-ValueEUTRA-v9e0    OPTIONAL, --
Cond ul-FreqMax
    nonCriticalExtension    SystemInformationBlockType2-vXeX-IEs    OPTIONAL
    -- Need OP
}

SystemInformationBlockType2-vXeX-IEs ::= SEQUENCE {
    SCell-deactivation-schedule-list    SEQUENCE (SIZE (1..maxSCells)) OF
SCellDeactivationScheduleInfo    OPTIONAL,  -- Need ON
    nonCriticalExtension        SEQUENCE {}                 OPTIONAL  -- Need OP
}

AC-BarringConfig ::=       SEQUENCE {
    ac-BarringFactor           ENUMERATED {
                                   p00, p05, p10, p15, p20, p25, p30, p40,
                                   p50, p60, p70, p75, p80, p85, p90, p95},
    ac-BarringTime             ENUMERATED {s4, s8, s16, s32, s64, s128, s256,
s512},
    ac-BarringForSpecialAC     BIT STRING (SIZE(5))
}

MBSFN-SubframeConfigList ::=    SEQUENCE (SIZE (1..maxMBSFN-Allocations)) OF
MBSFN-SubframeConfig SCellDeactivationScheduleInfo ::=  SEQUENCE {
        physCellId-r10              PhysCellId,
        dl-CarrierFreq-r10          ARFCN-ValueEUTRA,
        time-TS         INTEGER (0..MaxInt),
        time-TR         INTEGER (0..MaxInt),
        time-TC         INTEGER (0..MaxInt),
        time-TI
}

-- ASN1STOP
```

FIG. 3

LICENSED SHARED ACCESS SPECTRUM ALLOCATION

BACKGROUND

Data usage and demand for increased data delivery capacity of communications networks continue to rise with an increasing popularity of mobile devices, such as mobile phones, tablet devices, laptops, and so forth. To meet the increasing demand for bandwidth in communications networks, communications network operators and providers can extend a bandwidth capacity of the communications network using base stations that are configured to use a licensed shared access (LSA) spectrum. The base station can use the LSA spectrum in conjunction with a licensed communication spectrum and an unlicensed communication spectrum of the communications network to expand a communications spectrum available to the communications network. The LSA spectrum is typically assigned to an incumbent operator (primary user) that allows other operators (secondary user) to use the spectrum for communications.

Access by secondary operators to the LSA spectrum of the primary user enables a more efficient usage of available spectrum by allowing coordinated shared access to the LSA spectrum by the incumbent operator and other operators to address a communications spectrum shortage. The other operators can leverage the LSA spectrum as secondary users to access a wider spectrum that has traditionally been inaccessible, in order to address the increased data traffic over the communications networks of the other operators.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein:

FIG. 3 depicts an enhanced broadcast message for indicating a schedule to deactivate one or more secondary cells (SCells) in accordance with an example;

Figure 1:
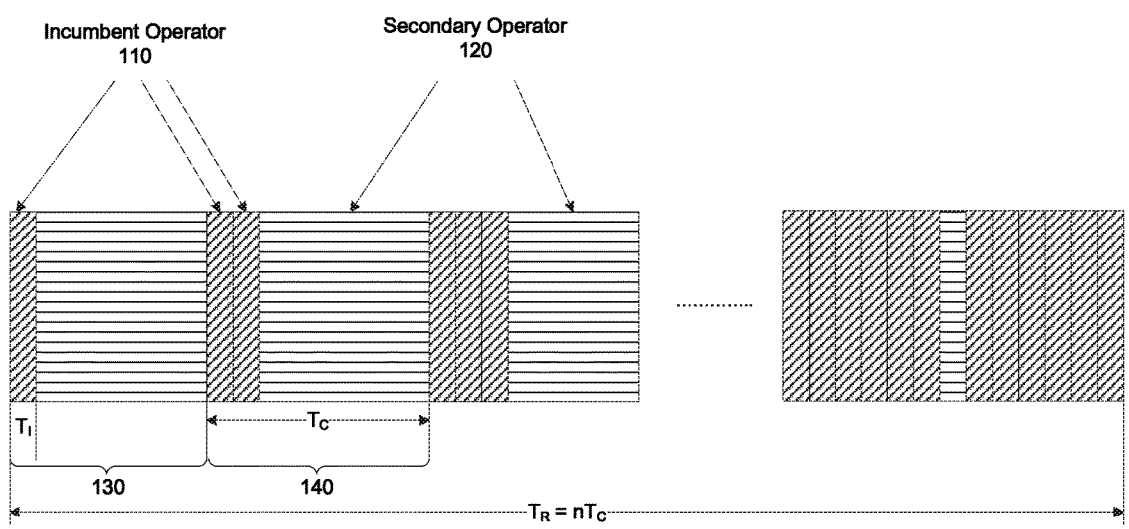
FIG. 1 depicts a timetable for a licensed shared access (LSA) spectrum release schedule for a secondary operator releasing an LSA spectrum to an incumbent operator in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

Traditionally, in communications networks, such as cellular networks, spectrum utilization and allocation is configured statically based on licensing of a portion of a communications spectrum from a regulatory agency to a network operator. The static spectrum allocation to network operators can limit a bandwidth of a communications network for each network operator. To increase bandwidth capacity in a communications network, a network operator and/or a communications network provider can extend a bandwidth capacity in the communications network using base stations, such as evolved node Bs (eNode Bs), which are configured to use a licensed shared access (LSA) spectrum.

An LSA spectrum is typically assigned to an incumbent operator (e.g. a primary user) that allows one or more other operators (e.g. secondary users) to use the LSA spectrum for communications. However, as the LSA spectrum is used by secondary operators, the LSA spectrum may need to be evacuated when an incumbent operator requests to use the LSA spectrum. Traditionally, the secondary operators evacuating the shared spectrum and return the shared spectrum back to the incumbent operator when the incumbent operator requests the shared spectrum can be difficult for the secondary operators. For example, when the incumbent operator suddenly requesting a secondary operator release a large LSA spectrum, continuing to maintain a threshold quality of service (QoS) level and/or bandwidth level can be challenging for the secondary operator to provide with a significant decrease of available spectrum.

In one configuration, the LSA spectrum can be evacuated by the secondary operator when the incumbent operator requests the LSA spectrum according to one or more predefined parameters and/or negotiated parameters and conditions. In another configuration, the one or more predefined parameters and/or negotiated parameters and conditions can be agreed upon by the incumbent operator and the secondary operator. In one example, the parameters and conditions can be fixed parameters and conditions, such as a location and/or a time when the spectrum is used by the incumbent operator. In one embodiment, the fixed parameters, such as a predefined location and/or a predefined time, can be incorporated into an LSA spectrum release schedule, as discussed in the proceeding paragraphs.

In another example, the parameters and conditions can be one or more dynamic parameters and/or dynamic conditions. In one embodiment, the incumbent operator can request an evacuation of the LSA spectrum for an emergency situation or when a bandwidth demand on a communications network of the incumbent operator increases. In one configuration, an LSA spectrum can be used in a European telecommunications standards institute (ETSI) reconfigurable radio system (ETSI RRS).

In one configuration, the secondary operator and/or the incumbent operator can be an operator in a communications network. In one embodiment, the communications network can be a cellular network. The cellular network can be configured to operate based on a cellular standard, such as the third generation partnership projection (3GPP) long term evolution (LTE) Rel. 8, 9, 10, 11, or 12 standard, or the institute of electronic and electrical engineers (IEEE) 802.16p, 802.16n, 802.16m-2011, 802.16h-2010, 802.16j-2009, or 802.16-2009 standard.

In another embodiment, the communications network can be a wireless local area network (such as a wireless fidelity network (Wi-Fi)) that can be configured to operate using a standard such as the IEEE 802.11-2012, IEEE 802.11ac, or IEEE 802.11ad standard. In another embodiment, the communications network can be configured to operate using a Bluetooth standard such as Bluetooth v1.0, Bluetooth v2.0, Bluetooth v3.0, or Bluetooth v4.0. In another embodiment, the communications network can be configured to operate using a ZigBee standard, such as the IEEE 802.15.4-2003 (ZigBee 2003), IEEE 802.15.4-2006 (ZigBee 2006), or IEEE 802.15.4-2007 (ZigBee Pro) standard.

In one configuration, a secondary operator, such as a 3GPP LTE network operator, and an incumbent operator can negotiate one or more LSA spectrum release parameters that define a procedure for releasing an LSA spectrum from the secondary operator to the incumbent operator. In one embodiment, the secondary operator can release the LSA spectrum based on the LSA spectrum release parameters when the secondary operator receives a spectrum release message from the incumbent operator. In another embodiment, when the secondary operator receives the spectrum release message from the incumbent operator, an evolved node B (eNode B) in a communications network of the secondary operator can compute an LSA spectrum release schedule, such as a SCell deactivation schedule, to release the LSA spectrum over a selected time period. In another embodiment, the eNode B can communicate the LSA spectrum release schedule to UEs in communication with the eNode B. In one example, the eNode B can broadcast or unicast the LSA spectrum release schedule to the UEs.

In one configuration, within the spectrum release period of the LSA spectrum release schedule, the incumbent operator and the secondary operator can share the LSA spectrum for a selected period of time. In one example, during the LSA spectrum release schedule, a share of time that the secondary operator can use the LSA spectrum can decrease over a predetermined and/or negotiated timetable, e.g. a transition of LSA spectrum from the secondary operator to the incumbent operator.

In one example, when the incumbent operator and the secondary operator have not agreed to a predetermined and/or negotiated timetable or a spectrum release timetable is shorter than a selected period of time, QoS levels for UEs in a communications network of the secondary operator can be uncertain or unreliable. In another example, when the spectrum release timetable exceeds a selected period of time, the incumbent operator may not be have adequate spectrum available for UEs in a communications network of the incumbent operator during selected situations or conditions (such as during an emergency communications situation). In one embodiment, the predetermined and/or negotiated timetable can be a selected period of time to enable the secondary operator to maintain a selected quality of service (QoS) level. In one example, the predetermined and/or negotiated timetable can be a selected to avoid a change in the LSA spectrum available to the secondary operator that exceeds a selected threshold for available LSA spectrum. One advantage of the predetermined and/or negotiated timetable for releasing the LSA spectrum from the secondary operator to the incumbent operator is to avoid abrupt call drops or QoS degradation for UEs of the secondary operator and the incumbent operator has LSA spectrum available when requested.

In one embodiment, the secondary operator and the incumbent operator can negotiate and/or renegotiate a timetable or schedule for an LSA spectrum release. In one configuration, the LSA spectrum release schedule can be based on LSA spectrum release parameters, e.g. parameters for the secondary operator to release the LSA spectrum when the secondary operator receives a spectrum release message from the incumbent operator.

FIG. 1 depicts a timetable for an LSA spectrum release schedule for a secondary operator 120 releasing an LSA spectrum to an incumbent operator 110. FIG. 1 further illustrates LSA spectrum release parameters that include: $T_R$, where $T_R$ is a time period for the eNode B to fully release the selected segments of the LSA spectrum; $T_S$, where $T_S$ is a starting time of the LSA spectrum release schedule; $T_C$, where $T_C$ is a periodic time interval of when a sharing ratio between the LTE network and the incumbent is updated starting from $T_S$ until $T_R$; and $T_I$, where $T_I$ is an amount of time that the eNB decreases a time sharing with the incumbent at every $T_C$ time interval. In one embodiment, the $T_R$ sharing ratio unit of time can be divided into a selected number of $T_C$ time units.

In one example, the incumbent operator can use the LSA spectrum for one $T_I$ time unit and the secondary operator can use the LSA spectrum for the remaining period of time during the $T_C$ time unit, as in block 130. In another example, the incumbent operator can use the LSA spectrum for two $T_I$ time units and the secondary operator can use the LSA spectrum for the remaining period of time during the $T_C$ time unit, as in block 140. In another example, an amount of time the incumbent operator can use the LSA spectrum can increase as an amount of time the secondary operator can use the LSA spectrum decreases until the LSA spectrum is fully released to the incumbent operator at the end of the LSA spectrum release schedule (e.g. $T_R$). In one embodiment, the secondary operator, such as an operator in a 3GPP LTE network, can use carrier aggregation to utilize the LSA spectrum as a SCell in conjunction with a primary spectrum of the secondary operator.

Figure 2:
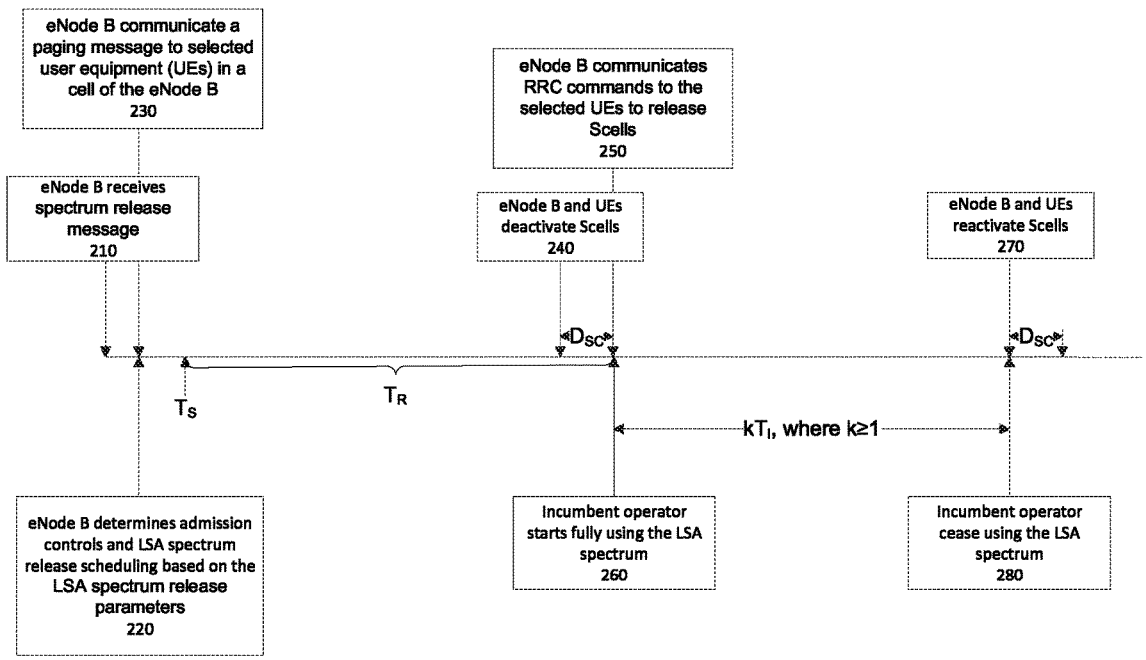
FIG. 2 depicts a timeframe for releasing an LSA spectrum from a secondary operator to an incumbent operator over a selected period of time in accordance with an example.

FIG. 2 illustrates a timeframe for releasing an LSA spectrum from a secondary operator to an incumbent operator over a selected period of time. In one example, an eNode B of the secondary operator can receive a spectrum release message from the incumbent operator to release the LSA spectrum to the incumbent, as in block 210. In one embodiment, the spectrum release message can include a specific time instant ($T_S$) indicating when the LSA spectrum release schedule will begin. In another example, the eNode B can evaluate one or more LSA spectrum release parameters (e.g. $T_I$, $T_C$ and/or $T_R$) and determine a change in availability of the LSA spectrum over the $T_R$ time period (e.g. the release of the LSA spectrum). In another example, the eNode B can determine admission controls and LSA spectrum release scheduling based on the LSA spectrum release parameters, as in block 220.

In one example, the eNode B can communicate to selected UEs in a cell of the eNode B an enhanced broadcast message that includes a deactivation schedule for the SCells on the LSA spectrum, as in block 230. In one embodiment, the enhanced broadcast message can include parameters $T_S$, $T_R$, $T_C$, $T_I$ and/or identifying information of the SCells to be deactivated. In another embodiment, the eNode B can perform one or more steps based on the LSA spectrum release parameters to minimize an effect on the UEs of releasing the LSA spectrum. In one configuration, the one or more steps can include the eNode B performing pro-active admission control to restrict one or more UEs from communicating, using the LSA spectrum, selected data types that use a quality of service (QoS) that exceeds a QoS threshold value. For example, the eNode B can restrict voice calls and/or data transfers that may not be supported at a selected QoS level for changes in available spectrum to the eNode B during the LSA spectrum release schedule. In another configuration, the one or more steps can include the eNode coordinating with adjacent eNode Bs to handover selected UEs to the adjacent eNode Bs to accommodate for the changes in the spectrum available to the eNode B during the LSA spectrum release schedule. In another configuration, the one or more steps can include the eNode adjusting QoS levels of voice and/or data communications by the UEs, such as ongoing calls by the UEs, through resource scheduling during the LSA spectrum release schedule.

In one example, the eNode B and the UEs can deactivate the SCells based on the LSA spectrum release schedule, as in block 240. In one configuration, the eNode B and the UEs can cease to communicate data with SCells associated with the LSA spectrum when the incumbent operator is scheduled to use the LSA spectrum. In another configuration, the eNode B and UEs can deactivate the SCell on LSA spectrum over a selected time period $D_{SC}$. In another configuration, the eNode B and UEs can deactivate the SCell 8 subframes ($D_{SC}$) prior to a starting of a next $T_C$. In one embodiment, the eNode B and UEs can deactivate the SCell in 8 milliseconds (ms), where each subframe is 1 millisecond. In another embodiment, a deactivation of a SCell can take $D_{SC}$ for the deactivation to take full effect. In another example, at the end of $T_R$ duration, the eNode B can communicate radio resource control (RRC) commands to the UEs to release SCells, as in block 250. In one embodiment, when the UEs releases SCells based on the RRC commands, the LSA spectrum is fully released to the incumbent operator. In one example, when the LSA spectrum is fully released to the incumbent operator, the eNode B and the UEs can continue communicating data on a primary cell (PCell) associated with the secondary operator and not on the LSA spectrum.

In one example, when the eNode B and the UEs have fully released the LSA spectrum, the incumbent operator can start fully using the LSA spectrum, as in block 260. In another example, the incumbent operator can fully use the LSA spectrum for a selected number of periods of time $T_I$, e.g. $kT_I$. In one embodiment, k is equal to or greater than 1 (e.g. k≥1). In another example, when the time period $kT_I$ expires, the eNode B and the UEs of the eNode B can reactive the SCells, as in block 270. In one embodiment, the secondary operator and the incumbent operator can renegotiate the LSA spectrum release parameters before the eNode B and UEs reactive the SCells. In another embodiment, the eNode B and UEs can reactive different SCells than the SCells the eNode B and UEs previously used. In another embodiment, the eNode B and UEs can reactive a different amounts of SCells than the SCells the eNode B and UEs previously used. In another example, when the eNode B and UEs reactive the SCells, the incumbent operator can cease using at least a portion of the LSA spectrum, as in block 280.

FIG. 3 depicts an enhanced broadcast message 300 for indicating a schedule to deactivate one or more SCells in a communications network. FIG. 3 further depicts that the enhanced broadcast message can include a SCell-deactivation-schedule-list field in a systemInformationBlockType2 information element. In one embodiment, the SCell-deactivation-schedule-list field of the system InformationBlockType2 information element is in bold typeface.

One advantage of using an LSA spectrum release schedule is for the secondary operator to release or give back the LSA spectrum to the incumbent operator over a graduated period of time to increase resource sharing between the incumbent operator and the secondary operator while minimizing an impact on the data transfers by the secondary operator while the secondary operator is using the LSA spectrum.

Figure 4:
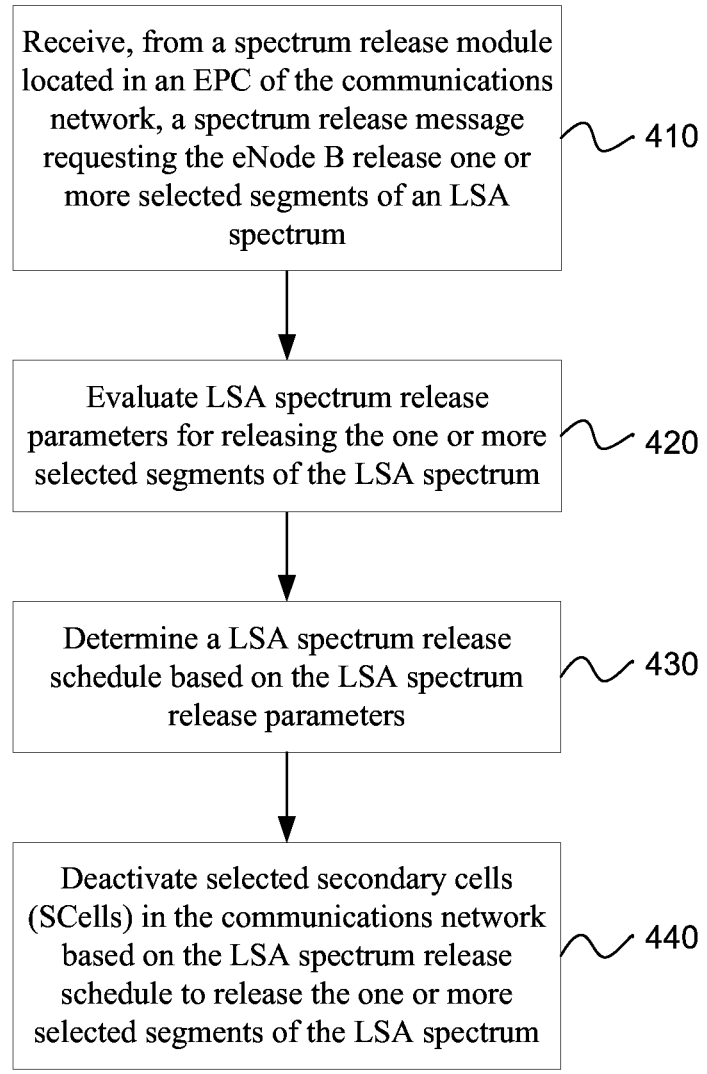
FIG. 4 depicts the functionality of computer circuitry of an evolved node B (eNode B) operable to release an LSA spectrum allocation in a communications network in accordance with an example.

Another example provides functionality 400 of computer circuitry of an eNode B operable to release a licensed shared access (LSA) spectrum allocation in a communications network, as shown in the flow chart in FIG. 4. The functionality may be implemented as a method or the functionality may be executed as instructions on a machine, where the instructions are included on at least one computer readable medium or one non-transitory machine readable storage medium. The computer circuitry can be configured to receive, from a spectrum release module located in an evolved packet core (EPC) of the communications network, a spectrum release message requesting the eNode B release one or more selected segments of an LSA spectrum, as in block 410. The computer circuitry can be further configured to evaluate LSA spectrum release parameters for releasing the one or more selected segments of the LSA spectrum, as in block 420. The computer circuitry can be further configured to determine an LSA spectrum release schedule based on the LSA spectrum release parameters, as in block 430. The computer circuitry can be further configured to deactivate selected secondary cells (SCells) in the communications network based on the LSA spectrum release schedule to release the one or more selected segments of the LSA spectrum, as in block 440.

In one embodiment, the computer circuitry can be further configured to communicate an enhanced broadcast message to selected user equipment (UEs) in a cell of the eNode B indicating a schedule to deactivate one or more SCells. In another embodiment, the computer circuitry can be further configured to communicate, to each UE in the cell of the eNode B, a radio resource control (RRC) command to release the one or more selected SCells to fully release the LSA spectrum allocation. In another embodiment, the LSA spectrum release parameters include: $T_R$, where $T_R$ is a time period for the eNode B to fully release the selected segments of the LSA spectrum; $T_S$, where $T_S$ is a starting time of the LSA spectrum release schedule; $T_C$, where $T_C$ is a periodic time interval of when a sharing ratio between the LTE network and the incumbent is updated starting from $T_S$ until $T_R$; and $T_i$, where $T_i$ is an amount of time that the eNB decreases a time sharing with the incumbent at every $T_C$ time interval.

In one configuration, the LSA spectrum release parameters are negotiated in real time or substantially real time with an incumbent communications network. In another configuration, the computer circuitry can be further configured to use one or more of the selected secondary cells (SCells) for the period of time $T_C$-$T_i$ in every $T_C$ time interval until time instant $T_R$.

Figure 5:
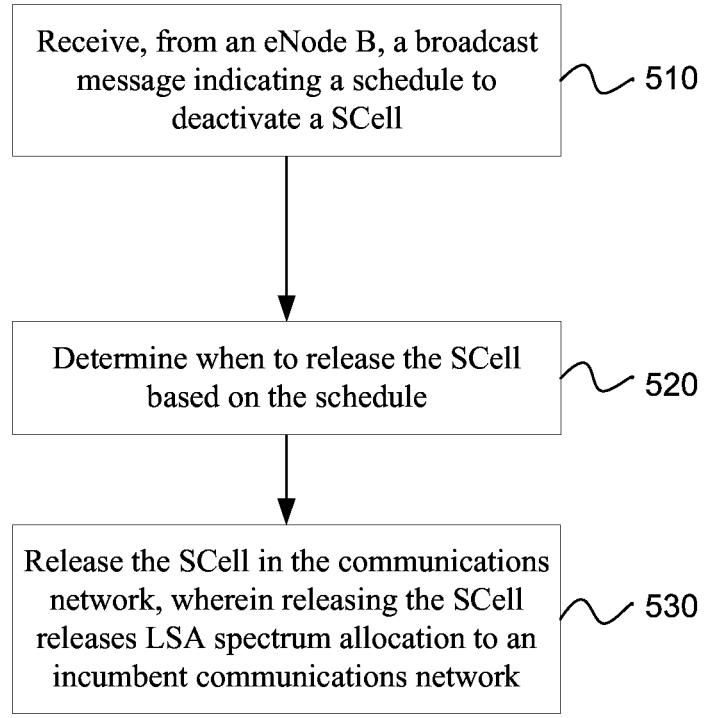
FIG. 5 depicts the functionality of computer circuitry of a user equipment (UE) operable to release an LSA spectrum allocation in a communications network in accordance with an example.

Another example provides functionality 500 of computer circuitry of a UE operable to release a licensed shared access (LSA) spectrum allocation in a communications network, as shown in the flow chart in FIG. 5. The functionality may be implemented as a method or the functionality may be executed as instructions on a machine, where the instructions are included on at least one computer readable medium or one non-transitory machine readable storage medium. The computer circuitry can be configured to receive, from an evolved Node B (eNode B), a broadcast message indicating a schedule to deactivate a secondary cell (SCell), as in block 510. The computer circuitry can be further configured to determine when to release the SCell based on the schedule, as in block 520. The computer circuitry can be further configured release the SCell in the communications network, wherein releasing the SCell releases LSA spectrum allocation to an incumbent communications network, as in block 530.

Figure 6:
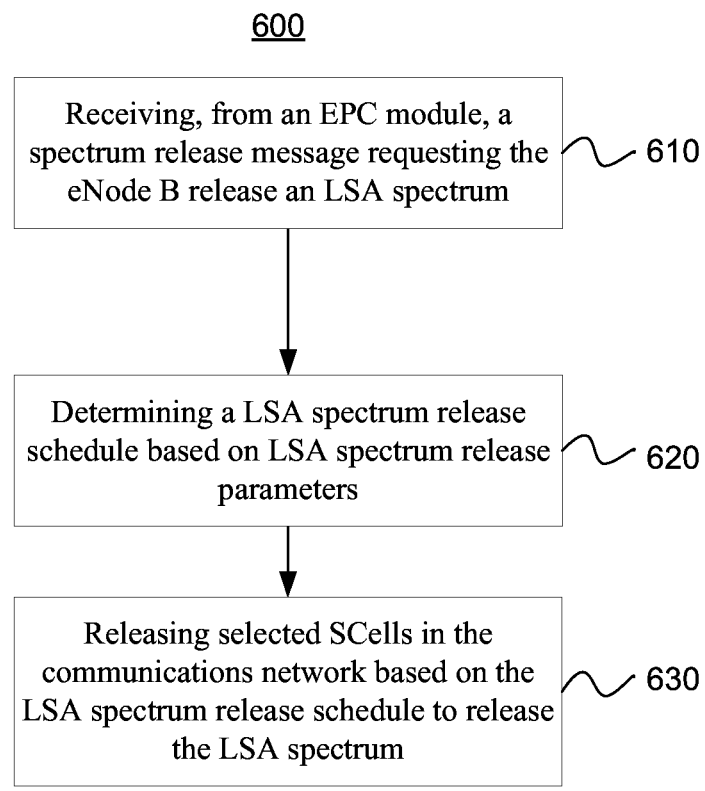
FIG. 6 depicts a product including a non-transitory storage medium having stored thereon instructions that are adapted to be executed to implement a method of releasing an LSA spectrum allocation in a communications network in accordance with an example.

In one embodiment, the computer circuitry can be further configured to release the SCell at a selected time indicated in the schedule. In another embodiment, the computer circuitry can be further configured to initiate releasing the SCell 8 subframes before the selected release time indicated in the schedule. In another embodiment, an enhanced system information message is broadcasted from the eNode B. In another embodiment, the computer circuitry can be further configured to receive a handover command when the eNode B is not capable of providing a quality of service (QoS) level used by the UE due to the LSA release schedule Another example provides functionality 600 of product including a non-transitory storage medium having stored thereon instructions that are adapted to be executed to implement a method of releasing a licensed shared access (LSA) spectrum allocation in a communications network, as in the flow chart in FIG. 6. The instructions of the product can be implemented as a method or as instructions on a machine, where the instructions are included on at least one computer readable medium or one non-transitory machine readable storage medium. The method can comprise receiving, from an evolved packet core (EPC) module, a spectrum release message requesting the eNode B release an LSA spectrum, as in block 610. The method can further comprise determining an LSA spectrum release schedule based on LSA spectrum release parameters, as in block 620. The method can further comprise releasing selected secondary cells (SCells) in the communications network based on the LSA spectrum release schedule to release the LSA spectrum, as in block 630.

In one example, the spectrum release message indicates a time instance ($T_S$) indicating when the LSA spectrum release schedule will begin. In another example, the LSA spectrum release parameters include: $T_R$, where $T_R$ is a time period for the eNode B to fully release the selected segments of the LSA spectrum; $T_S$, where $T_S$ is a starting time of the LSA spectrum release schedule; $T_C$, where $T_C$ is a periodic time interval when the sharing ratio between the eNode B and an incumbent is updated starting from $T_S$ until $T_R$; and $T_i$, where $T_i$ is a time amount by which the eNB decreases the time sharing with the incumbent at every $T_C$ time interval. In another example, the LSA spectrum release parameters are predetermined parameters. In another example, the LSA spectrum release parameters are negotiated in real time or substantially real time with an incumbent communications network. In another example, the method can further comprise restricting a UE from communicating, using the LSA spectrum, selected data types that use a quality of service (QoS) that exceeds a QoS threshold value.

In one configuration, the method can further comprise coordinating with other eNode Bs in the communications network to receive data traffic from one or more UEs using the LSA spectrum. In another configuration, the method can further comprise adjusting a quality of service (QoS) level provided to UEs transferring data. In another configuration, the method can further comprise adjusting a quality of service (QoS) level of a UE by scheduling resources for the UE based on the LSA spectrum release schedule.

Figure 7:
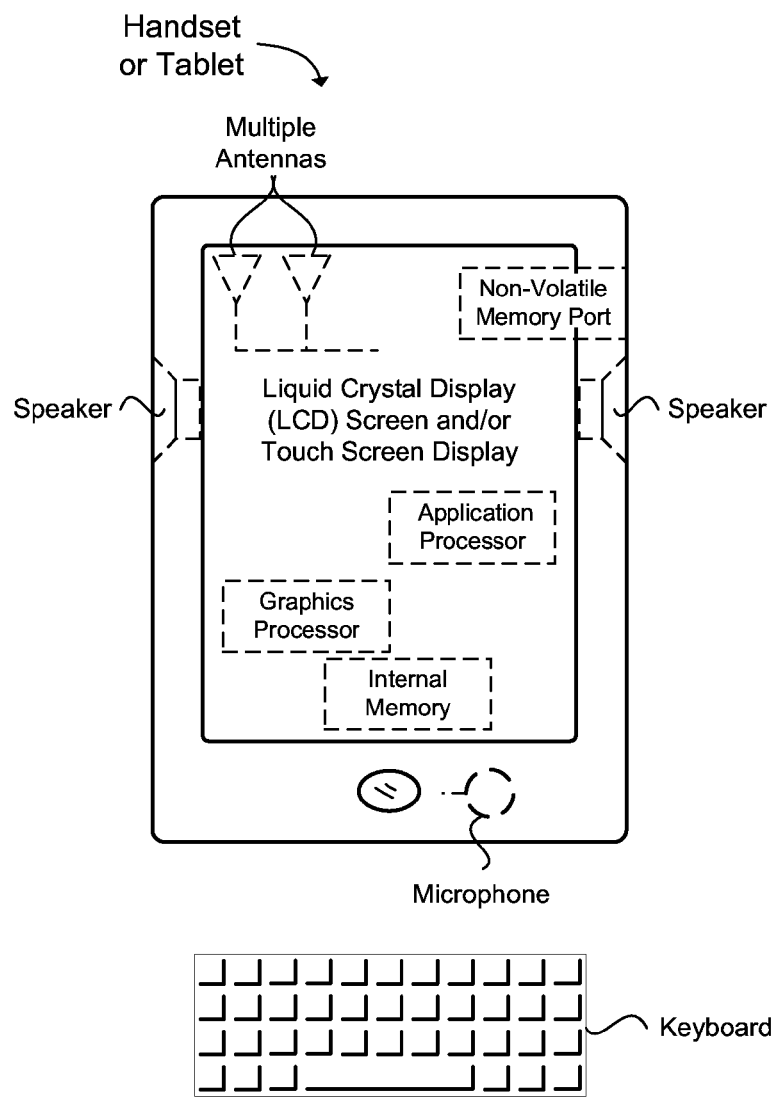
FIG. 7 illustrates a diagram of a UE in accordance with an example.

FIG. 7 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node or transmission station, such as a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or other type of wireless wide area network (WWAN) access point. The wireless device can be configured to communicate using at least one wireless communication standard including 3GPP LTE, WiMAX, High Speed Packet Access (HSPA), Bluetooth, and Wi-Fi. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 7 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be integrated with the wireless device or wirelessly connected to the wireless device to provide additional user input. A virtual keyboard can also be provided using the touch screen.

Various techniques, or certain aspects or portions thereof, can take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device can include a processor, a storage medium readable by the processor (including volatile and non-volatile memory and/or storage elements), at least one input device, and at least one output device. The volatile and non-volatile memory and/or storage elements can be a RAM, EPROM, flash drive, optical drive, magnetic hard drive, or other medium for storing electronic data. The base station and mobile station can also include a transceiver module, a counter module, a processing module, and/or a clock module or timer module. One or more programs that can implement or utilize the various techniques described herein can use an application programming interface (API), reusable controls, and the like. Such programs can be implemented in a high level procedural or object oriented programming language to communicate with a computer system. However, the program(s) can be implemented in assembly or machine language, if desired. In any case, the language can be a compiled or interpreted language, and combined with hardware implementations.

It should be understood that many of the functional units described in this specification have been labeled as modules, in order to more particularly emphasize their implementation independence. For example, a module can be implemented as a hardware circuit comprising custom VLSI circuits or gate arrays, off-the-shelf semiconductors such as logic chips, transistors, or other discrete components. A module can also be implemented in programmable hardware devices such as field programmable gate arrays, programmable array logic, programmable logic devices or the like.

Modules can also be implemented in software for execution by various types of processors. An identified module of executable code can, for instance, comprise one or more physical or logical blocks of computer instructions, which can, for instance, be organized as an object, procedure, or function. Nevertheless, the executables of an identified module need not be physically located together, but can comprise disparate instructions stored in different locations which, when joined logically together, comprise the module and achieve the stated purpose for the module.

Indeed, a module of executable code can be a single instruction, or many instructions, and can even be distributed over several different code segments, among different programs, and across several memory devices. Similarly, operational data can be identified and illustrated herein within modules, and can be embodied in any suitable form and organized within any suitable type of data structure. The operational data can be collected as a single data set, or can be distributed over different locations including over different storage devices, and can exist, at least partially, merely as electronic signals on a system or network. The modules can be passive or active, including agents operable to perform desired functions.

Reference throughout this specification to "an example" means that a particular feature, structure, or characteristic described in connection with the example is included in at least one embodiment of the present invention. Thus, appearances of the phrases "in an example" in various places throughout this specification are not necessarily all referring to the same embodiment.

As used herein, a plurality of items, structural elements, compositional elements, and/or materials can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention can be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics can be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. An evolved node B (eNode B) operable to release a licensed shared access (LSA) spectrum allocation in a communications network, the eNode B comprising one or more processors and memory configured to:

receive, from an evolved packet core (EPC) of the communications network, a spectrum release message requesting the eNode B release one or more selected segments of an LSA spectrum;

evaluate LSA spectrum release parameters for releasing the one or more selected segments of the LSA spectrum in response to receiving the spectrum release message;

determine an LSA spectrum release schedule for secondary cells (SCells) based on the LSA spectrum release parameters; and deactivate selected secondary cells (SCells) in the communications network based on the LSA spectrum release schedule to release the one or more selected segments of the LSA spectrum, wherein the LSA spectrum release parameters include: $T_R$, where $T_R$ is a time period for the eNode B to full release the selected segments of the LSA spectrum; $T_S$ where $T_S$ is a starting time between a Long Term Evolution (LTE) network and an incumbent is updated starting from $T_S$ until $T_R$; and $T_i$ where $T_i$ is an amount of time that the eNB decreases a time sharing with the incumbent at every $T_C$ time interval.

2. The eNode B of claim 1, wherein the one or more processors and memory are further configured to communicate an enhanced broadcast message to selected user equipment (UEs) in a cell of the eNode B indicating a schedule to deactivate one or more SCells.

3. The eNode B of claim 1, wherein the one or more processors and memory are further configured to communicate, to each UE in the cell of the eNode B, a radio resource control (RRC) command to release the one or more selected SCells to fully release the LSA spectrum allocation.

4. The eNode B of claim 1, wherein the LSA spectrum release parameters are negotiated in real time or substantially real time with an incumbent communications network.

5. The eNode B of claim 1, wherein the one or more processors and memory are further configured to use one or more of the selected secondary cells (SCells) for the period of time Tc-Ti in every Tc time interval until time instant TR.

6. A user equipment (UE) operable to release a licensed shared access (LSA) spectrum allocation in a communications network, the UE having circuitry configured to:

receive, from an evolved Node B (eNode B), a broadcast message indicating a schedule to deactivate a secondary cell (SCell);

determine when to release the SCell based on the schedule; and release the SCell in the communications network, wherein releasing the SCell releases LSA spectrum allocation to an incumbent communications network, wherein the schedule is determined based on LSA spectrum release parameters, and the LSA spectrum release parameters include: TR, where TR is a time period for the eNode B to fully release the selected segments of the LSA spectrum; TS, where TS is a starting time of the LSA spectrum release schedule; TC, where TC is a periodic time interval of when a sharing ratio between a Long Term Evolution (LTE) network and an incumbent is updated starting from TS until TR; and Ti, where Ti is an amount of time that the eNB decreases a time sharing with the incumbent at every TC time interval.

7. The circuitry of claim 6, further configured to release the SCell at a selected time indicated in the schedule.

8. The circuitry of claim 7, wherein an enhanced system information message is broadcasted from the eNode B.

9. The circuitry of claim 6, further configured to receive a handover command when the eNode B is not capable of providing a quality of service (QoS) level used by the UE due to the LSA release schedule.

10. The circuitry of claim 7, further configured to initiate releasing the SCell a defined number of subframes before the selected release time indicated in the schedule.

11. A non-transitory machine readable storage medium having instructions embodied thereon for releasing a licensed shared access (LSA) spectrum allocation in a communications network, the instructions when executed perform the following:

receiving, using one or more processors at an eNode B, from an evolved packet core (EPC), a spectrum release message requesting the eNode B release an LSA spectrum;

determining, using the one or more processors at the eNode B, an LSA spectrum release schedule based on LSA spectrum release parameters; and releasing, using the one or more processors at the eNode B, selected secondary cells (SCells) in the communications network based on the LSA spectrum release schedule to release the LSA spectrum, wherein the LSA spectrum release parameters include: TR, where TR is a time period for the eNode B to fully release the selected segments of the LSA spectrum; TS, where TS is a starting time of the LSA spectrum release schedule; TC, where TC is a periodic time interval of when a sharing ratio between a Long Term Evolution (LTE) network and an incumbent is updated starting from TS until TR; and Ti, where Ti is an amount of time that the eNB decreases a time sharing with the incumbent at every TC time interval.

12. The non-transitory machine readable storage medium of claim 11, wherein the spectrum release message indicates a time instance ($T_S$) indicating when the LSA spectrum release schedule will begin.

13. The non-transitory machine readable storage medium of claim 11, wherein the LSA spectrum release parameters are predetermined parameters.

14. The non-transitory machine readable storage medium of claim 11, wherein the LSA spectrum release parameters are negotiated in real time or substantially real time with an incumbent communications network.

15. The non-transitory machine readable storage medium of claim 11, further comprising instructions when executed perform the following: restricting a UE from communicating, using the LSA spectrum, selected data types that use a quality of service (QoS) that exceeds a QoS threshold value.

16. The non-transitory machine readable storage medium of claim 11, further comprising instructions when executed perform the following: coordinating with other eNode Bs in the communications network to receive data traffic from one or more UEs using the LSA spectrum.

17. The non-transitory machine readable storage medium of claim 11, further comprising instructions when executed perform the following: adjusting a quality of service (QoS) level provided to UEs transferring data.

18. The non-transitory machine readable storage medium of claim 11, further comprising instructions when executed perform the following: adjusting a quality of service (QoS) level of a UE by scheduling resources for the UE based on the LSA spectrum release schedule.

* * * * *